(12) United States Patent
Tulasi

(10) Patent No.: US 10,572,206 B2
(45) Date of Patent: Feb. 25, 2020

(54) SYSTEM AND METHOD FOR MINIMIZING SCREEN SPACE REQUIRED FOR DISPLAYING AUXILIARY CONTENT

(71) Applicant: Vinuth Tulasi, Bangalore (IN)

(72) Inventor: Vinuth Tulasi, Bangalore (IN)

( * ) Notice: Subject to any disclaimer, the term of this patent is extended or adjusted under 35 U.S.C. 154(b) by 93 days.

(21) Appl. No.: 15/246,403

(22) Filed: Aug. 24, 2016

(65) Prior Publication Data

US 2017/0060509 A1     Mar. 2, 2017

(30) Foreign Application Priority Data

Aug. 28, 2015 (IN) ............................ 4551/CHE/2015

(51) Int. Cl.
*G06F 3/14*     (2006.01)
*G06F 17/27*   (2006.01)
*G06F 17/24*   (2006.01)
*G06F 3/0484*  (2013.01)

(52) U.S. Cl.
CPC ............ *G06F 3/14* (2013.01); *G06F 3/04842* (2013.01); *G06F 17/241* (2013.01); *G06F 17/248* (2013.01); *G06F 17/2705* (2013.01); *G06F 17/277* (2013.01); *G06F 17/278* (2013.01); *G06F 17/2785* (2013.01); *G09G 2340/145* (2013.01); *G09G 2370/027* (2013.01)

(58) Field of Classification Search
CPC .................................. G06F 17/24; G06F 3/14
See application file for complete search history.

(56) References Cited

U.S. PATENT DOCUMENTS

| | | | | |
|---|---|---|---|---|
| 2008/0189620 A1* | 8/2008 | Bonforte | ............... | G06F 17/248 715/751 |
| 2012/0246054 A1* | 9/2012 | Sastri | ..................... | G06Q 40/06 705/37 |
| 2014/0046976 A1* | 2/2014 | Zhang | ................ | G06Q 30/0255 707/772 |
| 2014/0173460 A1* | 6/2014 | Kim | ........................ | H04L 51/18 715/753 |
| 2016/0062732 A1* | 3/2016 | Jaygar | ....................... | G06F 7/36 707/754 |

* cited by examiner

*Primary Examiner* — Sherrod L Keaton
(74) *Attorney, Agent, or Firm* — The Law Office of Austin Bonderer, PC; Austin Bonderer

(57) ABSTRACT

A system and method for minimizing a requirement of screen space of displaying auxiliary content based on selected content are provided. The method includes following steps of (a) obtaining an input to select the content displayed in at least one of (i) a webpage or (ii) an application, and triggering the selected content; (b) processing the selected content; (c) generating a semantic representation of the selected content from the parse tree data structure; (d) determining a theme for the selected content based on the semantic representation of the selected content; (e) determining a template, that matches with the theme; (f) providing named entity extracted values in the template based on the semantic representation of the selected content; (g) obtaining the auxiliary content associated with the selected content and (h) displaying the auxiliary content in a screen space where the selected content is displayed.

8 Claims, 15 Drawing Sheets

SYSTEM AND METHOD FOR MINIMIZING SCREEN SPACE REQUIRED FOR DISPLAYING AUXILIARY CONTENT

CROSS-REFERENCE TO RELATED APPLICATIONS

This application claims priority to Indian patent application no. 4551/CHE/2015 filed on Aug. 28, 2015, the complete disclosure of which, in its entirely, is herein incorporated by reference.

BACKGROUND

Technical Field

The embodiments herein generally relate to mobile devices and applications, and, more particularly, to a system and a method for minimizing a requirement of screen space for displaying auxiliary content based on a selected content by triggering the selected content.

Description of the Related Art

Recommendations and suggestions are key drivers in Internet and mobile applications, mobile applications that lead to user actions such as purchases and decisions. Users need to be constantly engaged in order to repeatedly use an application or a website. These recommendations and suggestions that are displayed come with an extra cost since they are auxiliary or additional information, and they consume more screen space, which is limited in devices with small screens such as mobile phone and tablet computers. Further, the main content of the application goes unnoticed when the auxiliary content consumes a lot of screen space. Hence the entire screen becomes clumsy and irritating to the users.

Accordingly, there remains a need for minimizing a requirement of screen space for displaying auxiliary information content based on a selected content.

SUMMARY

In view of the foregoing, an embodiment herein provides a computer implemented method for minimizing a requirement of a screen space for displaying an auxiliary content based on content. The computer implemented method includes the following step of: (a) obtaining an input to select the content displayed in at least one of (i) a webpage or (ii) an application, and triggering the selected content; (b) processing the selected content includes of (i) tokenizing the selected content to obtain one or more tokens; (ii) segmenting the selected content to obtain one or more segmented contents; (iii) analyzing the selected content to determine parts of speech assignment associated with the selected content; and (iv) sentential parsing the selected content by combining the one or more tokens; (c) obtaining a parse tree data structure based on (i) the one or more tokens, (ii) the one or more segmented contents, (iii) the parts of speech assignment associated with the selected content or (iv) the sentential parsed content; (d) generating a semantic representation of the selected content from the parse tree data structure; (e) determining a theme for the selected content based on the semantic representation of the selected content; (f) determining a template, that matches with the theme, for the selected content; (g) providing named entity extracted values in the template based on the semantic representation of the selected content; (h) obtaining the auxiliary content associated with the selected content; and (i) displaying the auxiliary content in a screen space where the selected content is displayed. The triggering includes at least one of (a) flipping the selected content, (b) swiping the selected content, (c) clicking to select a menu item in a context menu option associated with the selected content or (d) clicking to select an indicator button option after a selection of the selected content. The one or more tokens include at least one of words, phrases, symbols or other meaningful elements associated with the selected content. The semantic representation is a data structure representing a meaning associated with the selected content. The auxiliary content includes relevant information, recommendations or suggestions associated with the selected content.

In an embodiment, displaying of the auxiliary content includes at least one of (a) replacing the selected content with the auxiliary content or (b) displaying the auxiliary content along with the selected content in line to the auxiliary content. The displaying of a whole content in the user device is re-aligned and re-laid to provide the screen space for the auxiliary content.

In another embodiment, the method further includes consulting a knowledge base or an external service to analyze and infer information associated with the selected content.

In yet another embodiment, the method further includes grouping information associated with the selected content into a class of auxiliary data and communicating the auxiliary data to a user device.

In one aspect, a non-transitory program storage device readable by a computer, and comprising a program of instructions executable by the computer to perform a method for minimizing a requirement of screen space for displaying an auxiliary content based on content is provided. The method includes the following steps of: (a) obtaining an input to select the content displayed in at least one of (i) a webpage or (ii) an application, and triggering the selected content; (b) processing the selected content includes of (i) tokenizing the selected content to obtain one or more tokens; (ii) segmenting the selected content to obtain one or more segmented contents; (iii) analyzing the selected content to determine parts of speech assignment associated with the selected content; and (iv) sentential parsing the selected content by combining the one or more tokens; (c) obtaining a parse tree data structure based on (i) the one or more tokens, (ii) the one or more segmented contents, (iii) the parts of speech assignment associated with the selected content or (iv) the sentential parsed content; (d) generating a semantic representation of the selected content from the parse tree data structure; (e) determining a theme for the selected content based on the semantic representation of the selected content; (f) determining a template, that matches with the theme, for the selected content; (g) providing named entity extracted values in the template based on the semantic representation of the selected content; (h) obtaining the auxiliary content associated with the selected content; and (i) displaying the auxiliary content in a screen space where the selected content is displayed. The triggering includes at least one of (a) flipping the selected content, (b) swiping the selected content, (c) clicking to select a menu item in a context menu option associated with the selected content or (d) clicking to select an indicator button option after a selection of the selected content. The one or more tokens include at least one of words, phrases, symbols or other meaningful elements associated with the selected content. The semantic representation is a data structure representing a meaning associated with the selected content. The auxiliary content includes relevant information, recommendations or suggestions associated with the selected content.

In an embodiment, displaying of the auxiliary content includes at least one of (a) replacing the selected content with the auxiliary content or (b) displaying the auxiliary content along with the selected content in line to the auxiliary content. The displaying of a whole content in the user device is re-aligned and re-laid to provide the screen space for the auxiliary content.

In another embodiment, the method further includes consulting a knowledge base or an external service to analyze and infer information associated with the selected content.

In yet another embodiment, the method further includes grouping information associated with the selected content into a class of auxiliary data and communicating the auxiliary data to a user device.

In another aspect, a server for minimizing a requirement of a screen space for displaying auxiliary content based on a selected content is provided. The server comprises a memory unit that stores a server database and a set of modules, and a processor that executes the set of modules. The set of modules include a content processing module, a parse tree obtaining module, a semantic representation generating module, a theme determining module, a template determining module and a value providing module. The content processing module includes a content tokenizing module, a content segmenting module, a content analyzing module and a content parsing module. The content processing module, implemented by the processor, that processes the selected content when the server obtains the selected content from a user device. The content tokenizing module, implemented by the processor, that tokenizes the selected content to obtain one or more tokens. The one or more tokens include at least one of words, phrases, symbols or other meaningful elements associated with the selected content. The content segmenting module, implemented by the processor, that segments the selected content into one or more segmented contents. The content analyzing module, implemented by the processor, that analyzes the selected content to determine parts of speech assignment associated with the selected content. The content parsing module, implemented by the processor, that sententially parses the selected content by combining the one or more tokens. The parse tree obtaining module, implemented by the processor, that obtains a parse tree data structure based on (a) the one or more tokens, (b) the one or more segmented contents, (c) the parts of speech assignment associated with the selected content or (d) the sentential parsed content. The semantic representation generating module, implemented by the processor, that generates a semantic representation of the selected content from the parse tree data structure. The semantic representation is a data structure representing a meaning associated with the selected content. The theme determining module, implemented by the processor, that determines a theme for the selected content based on the semantic representation of the selected content. The template determining module, implemented by the processor, that determines a template that matches with the theme, for the selected content. The value providing module, implemented by the processor, that provides named entity extracted values in the template based on the semantic representation of the selected content.

In an embodiment, the server further comprises a knowledge base analyzing module, implemented by the processor, that consults a knowledge base or an external service to analyze and infer information associated with the selected content.

In another embodiment, the server further comprises an information grouping module, implemented by the processor, that groups the information associated with the selected content into a class of auxiliary data and communicates the class of auxiliary data to a user device.

In yet another embodiment, the user device includes a content obtaining module, an auxiliary content obtaining module and a content displaying module. The content obtaining module, implemented by the processor, that obtains an input to select the content displayed in at least one of (a) a webpage or (b) an application, and triggers the selected content. The auxiliary content obtaining module, implemented by the processor, that obtains the auxiliary content associated with the selected content. The content displaying module, implemented by the processor, that displays the auxiliary content with the relevant information, the recommendations or the suggestions in the screen space where the selected content is displayed. The selected content is triggered by at least one of (a) flipping the selected content, (b) swiping the selected content, (c) clicking to select a menu item in a context menu option associated with the selected content or (d) clicking to select an indicator button option after a selection of the selected content.

In yet another embodiment, the content displaying module that displays at least one of (a) the auxiliary content by replacing the selected content, or (b) the auxiliary content along with the selected content in line to the auxiliary content. A whole content in the user device is re-aligned and re-laid to provide the screen space for displaying the auxiliary content.

In yet another embodiment, the selected content is a text, an image or a portion of the image, or a video.

In yet another embodiment, the auxiliary content allows interactions. The interaction includes at least one of (a) a text, (b) a voice, (c) an image, or (d) a video inputted by the user.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
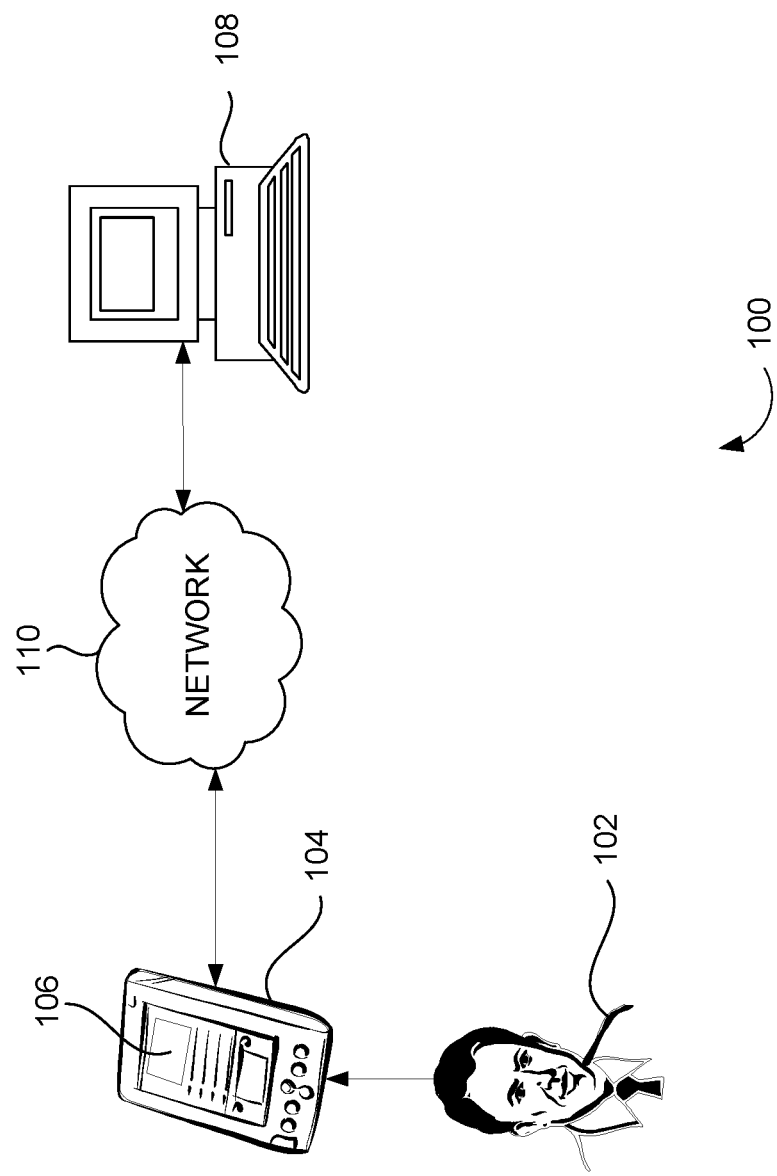
FIG. 1 illustrates a system view of replacing a selected content with an auxiliary content associated with the selected content using a content recommendation and suggestion system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method to minimize a requirement of a screen space of displaying information using triggering a selected content. The embodiments herein achieve this by using a content recommendation and suggestion system to trigger the selected content to replace with an auxiliary content (e.g., including relevant information, recommendations and suggestions) associated with the selected content from a server. Further, gestures such as flipping and/or swiping (i.e. trigger the selected content) the selected content to replace the selected content with the auxiliary content associated with the selected content. Referring now to the drawings, and more particularly to FIGS. 1 through 8, where similar reference characters denote corresponding features consistently throughout the figures, there are shown preferred embodiments.

FIG. 1 illustrates a system view 100 of replacing a selected content with an auxiliary content associated with the selected content using a content recommendation and suggestion system 106 according to an embodiment herein. The auxiliary content may include relevant information, recommendations, suggestions etc. The system view 100 includes the user 102, a user device 104, the content recommendation and suggestion system 106, a server 108, and a network 110. In an embodiment, the content recommendation and suggestion system 106 is installed in the user device 104. In another embodiment, the content recommendation and suggestion system 106 is installed in the server 108. The user 102 inputs to select content displayed in at least one of (a) a webpage or (b) an application in the user device 104. The selected content is triggered by at least one of (a) flipping the selected content, (b) swiping the selected content, (c) clicking to select a menu item in a context menu option associated with the selected content or (d) clicking to select an indicator button option after a selection of the selected content. The application may be standalone applications, an android application, an IOS, etc. running in a browser (e.g. the website) in the user device 104. The relevant information, the recommendations, and the suggestions are obtained from the server 108 based on the selected content using the network 110. In an embodiment, the auxiliary content allows interactions. The interaction may include at least one of (a) a text, (b) a voice, (c) an image, or (d) a video inputted by the user 102. In another embodiment, the selected content and the auxiliary content may be a text, a video content, an image or a portion of the image.

The requirement of a screen space is minimized for displaying information of the selected content that is replaced with the auxiliary content. In one embodiment, clicking of the selected content is performed using a mouse in the user device 104 to replace the selected content with the auxiliary content. In one embodiment, the network 110 may be a wireless network, a LAN, and a WAN, etc. The user device 104 may be a computer, a mobile phone, a kindle, a PDA (Personal Digital Assistant), a tablet, a music player, an electronic notebook or a smartphone. The server 108 may be a computer, a mobile phone, a tablet, a music player, an electronic notebook or a smartphone.

Figure 2A:
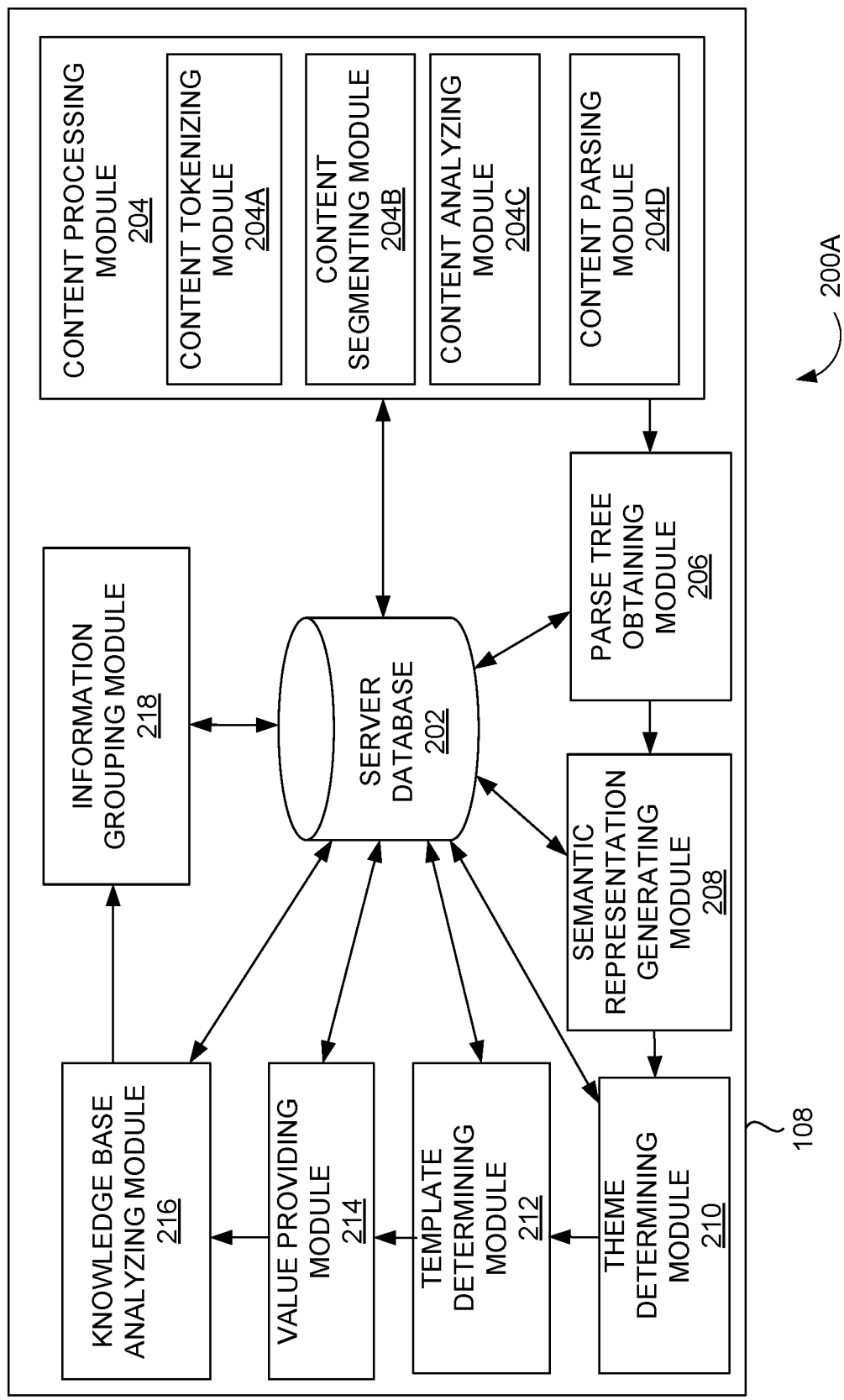
FIG. 2A illustrates an exploded view of a server of FIG. 1 according to an embodiment herein.

FIG. 2 illustrates an exploded view 200A of a server 108 of FIG. 1 according to an embodiment herein. The exploded view 200A includes a server database 202, a content processing module 204, a parse tree obtaining module 206, a semantic representation module 208, a theme determining module 210, a template determining module 212, a value providing module 214, a knowledge base analyzing module 216 and an information grouping module 218. The content processing module 204 includes a content tokenizing module 204A, a content segmenting module 204B, a content analyzing module 204C and a content parsing module 204D. The database 202 stores information about the selected content and the auxiliary content associated with the selected content. The content processing module 204 processes the selected content when the server 108 obtains the selected content from the user device 104. The content tokenizing module 204A tokenizes the selected content to obtain one or more tokens. The one or more tokens include at least one of words, phrases, symbols or other meaningful elements associated with the selected content. The content segmenting module 204B segments the selected content into one or more segmented contents. The content analyzing module 204C analyzes the selected content to determine parts of speech assignment associated with the selected content. The content parsing module 204D sententially parses the selected content by combining the one or more tokens.

The parse tree obtaining module 206 obtains a parse tree data structure based on (a) the one or more tokens, (b) the one or more segmented contents, (c) the parts of speech assignment associated with the selected content or (d) the sentential parsed content. The semantic representation generating module 208 generates a semantic representation of the selected content from the parse tree data structure. The representation is a data structure representing a meaning associated with the selected content. The theme determining module 210 determines a theme for the selected content based on the semantic representation of the selected content. The template determining module 212 determines a template that matches with the theme, for the selected content. The value providing module 214 provides named entity extracted values in the template based on the semantic representation of the selected content. The knowledge base analyzing module 216 consults a knowledge base or an external service to analyze and infer information associated the selected content. The information grouping module 218 groups the information associated with the selected content into a class of auxiliary data and communicates the class of auxiliary data to the user device 104.

Figure 2B:
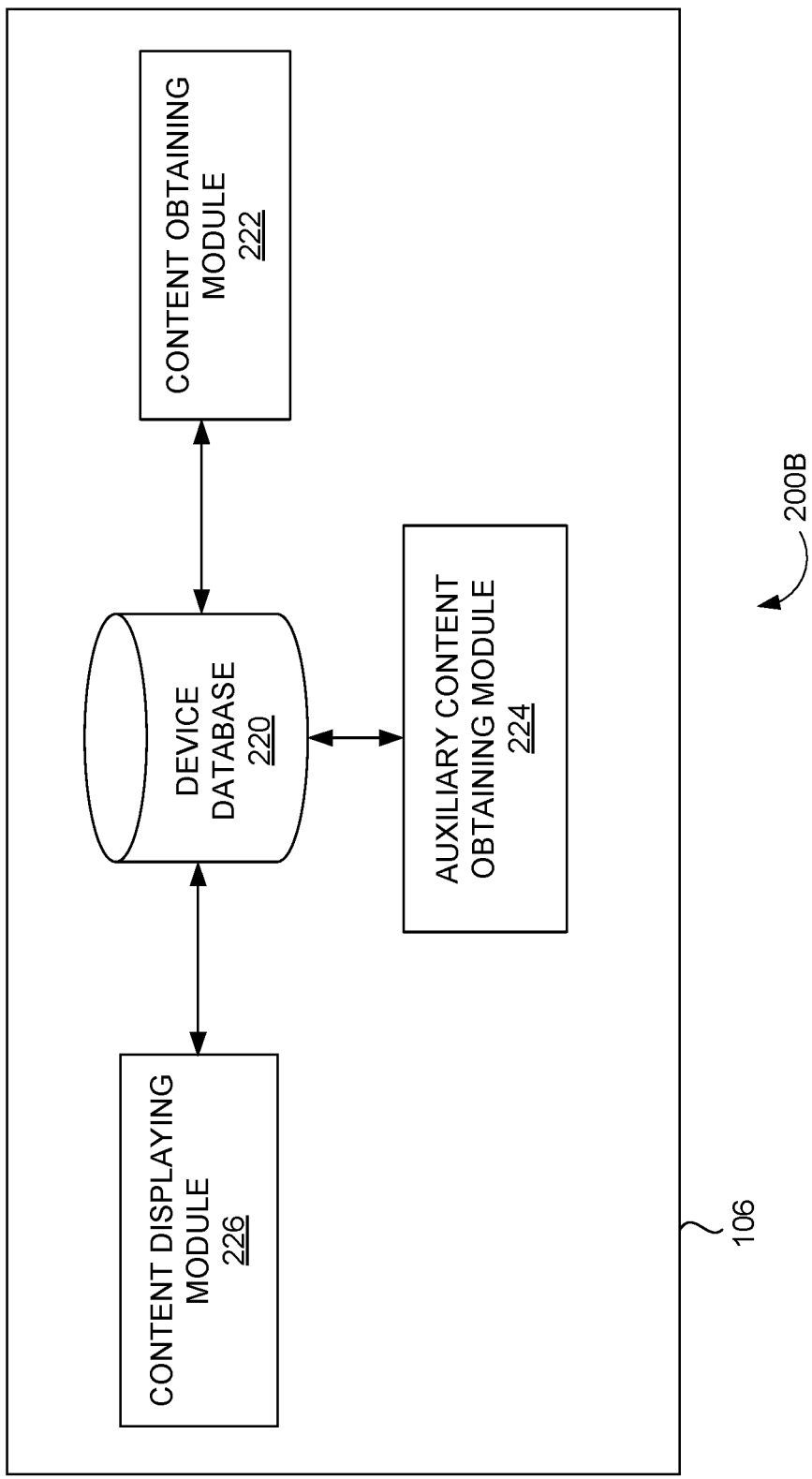
FIG. 2B illustrates an exploded view of the content recommendation and suggestion system in a user device of FIG. 1 according to an embodiment herein.
Figure 3A:
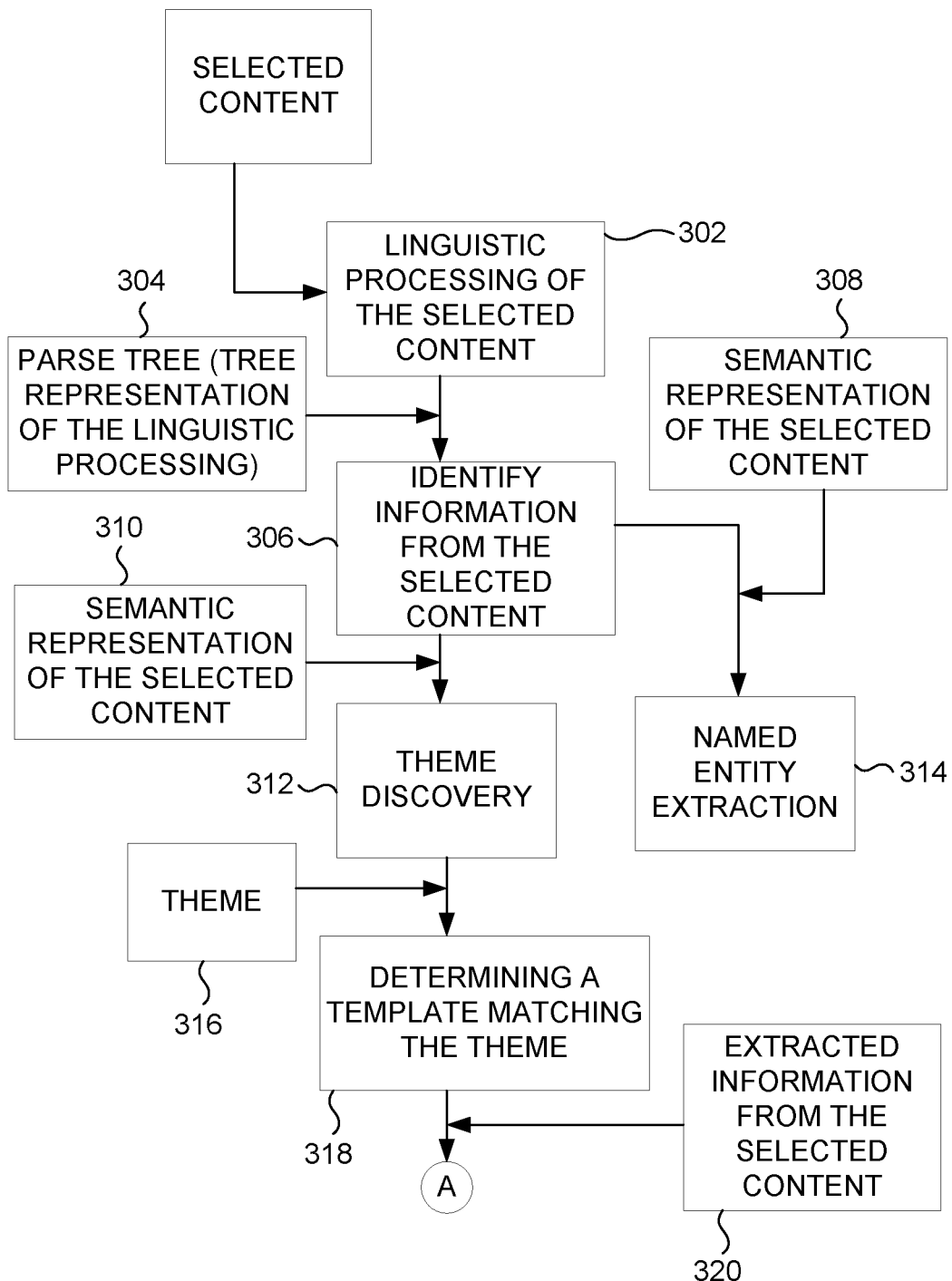
FIGS. 3A-3B are flow diagrams that illustrate the process of fetching auxiliary content associated with a selected content from a server of FIG. 1 according to an embodiment herein.
Figure 3B:
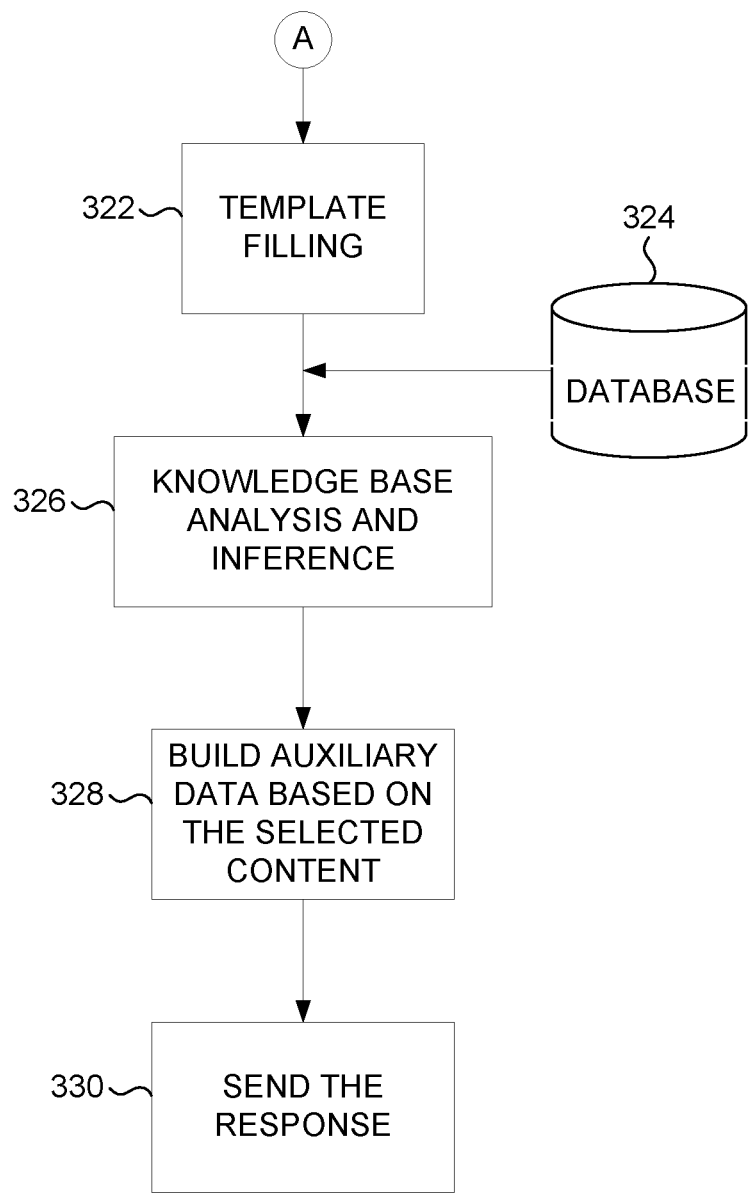

FIG. 2B illustrates an exploded view 200B of the content recommendation and suggestion system 106 installed in the user device 104 of FIG. 1 according to an embodiment herein. The exploded view 200B includes a device database 220, a content obtaining module 222, an auxiliary content obtaining module 224 and a content displaying module 226. The device database 220 stores information about the selected content and/or the auxiliary content associated with the selected content. The content obtaining module 222 obtains an input to select the content displayed in at least one of (a) a webpage or (b) an application, and triggers the selected content. In an embodiment, the selected content is triggered by at least one of (a) flipping the selected content, (b) swiping the selected content, (c) clicking to select a menu item in a context menu option associated with the selected content or (d) clicking to select an indicator button option after a selection of the selected content. In an embodiment, the clicking of at least one of (a) the menu item or (b) the indicator button option is performed using a mouse. The auxiliary content obtaining module 224 obtains the auxiliary content associated with the selected content. The auxiliary content may include the relevant information, the recommendations or the suggestions associated with the selected content. The content displaying module 226 displays the auxiliary content with the relevant information, the recommendations or the suggestions in a screen space where the selected content is displayed. In an embodiment, the content displaying module 226 displays at least one of (a) the auxiliary content by replacing the selected content or (b) the auxiliary content along with the selected content inline to the auxiliary content, wherein a whole content in the user device 104 is re-aligned and re-laid to provide the screen space for displaying the auxiliary content. In an embodiment, FIGS. 3A-3B are flow diagrams that illustrate the process of fetching auxiliary content associated with the selected content using a server 108 of FIG. 1 according to an embodiment herein. At step 302, the relevant information of a selected content is processed when a server 108 receives an input (e.g., selected content) from a user device 104.

In one embodiment, the step 302 may include a linguistic process that involves tokenization, sentence segmentation, parts of speech assignment, and sentential parsing of the selected content. The selected content may be tokenized into one or more tokens. The one or more tokens include at least one of words, phrases, symbols or other meaningful elements associated with the selected content. The selected content may be segmented into one or more segmented contents. The selected content may be analyzed to determine parts of speech assignment associated with the selected content. The selected content may be sententially parsed by combining the one or more tokens. As the result of the linguistic process, a parse tree data structure is received at step 304. The parse tree data structure is a tree representation of the linguistic process of the selected content.

At step 306, the selected content may be identified (e.g., by the server 108), which is may be a part of the information extraction process. The step 306 may further involve into (a) a theme discovery step, and (b) a named entity extraction step. At step 308, a semantic representation is generated as an output of the selected content from the parse tree and provided into the named entity extraction. The semantic representation is an access requiring to the meaning associated with the given input (i.e. selected content). At step 310, the semantic representation is provided into the theme discovery. At step 312, overall theme of the selected content is determined when the semantic representation is provided into the theme discovery step.

In one embodiment, the selected content is about sports, politics, movies, etc. The themes of the selected content are known at the end of the step 312. At step 314, more information are known about the selected content when the semantic representation is provided into the named entity extraction step. For example, if the selected content is "Sundar Pichai is the CEO of Google", the named entity content is extracted from the selected content in the form shown below.

| |
|---|
| Name: Sundar Pichai |
| Organization: Google |
| Position: CEO |

At step 316, the themes are provided into a corresponding template. The template is a preset format that is used as a starting point for further representation of the selected content. At step 318, the right template is determined, that matches with the theme, for the selected content. For example, if the theme is about movies, then the movies template is picked. The movies template is shown below.

| Movie Template |
|---|
| Movie Name: |
| Movie Time: |
| Location of the cinema: |
| Number of tickets: |
| Rating of the movie |
| . . . |
| . . . |

At step 322, the determined template is filled by values (e.g. named entity extracted values) obtained from the named entity extraction step. The template filling is one to one mapping of fields and the values in the named entities to the fields and values of the template. For example, once the template is filled with the values received from the named entities extraction step, the filled movie template is populated as shown below.

| Movie Template |
|---|
| Movie Name: Titanic |
| Movie Time: 3:30 PM, Monday |
| Number of tickets: 4 |
| . . . |
| . . . |

In one embodiment, the information of the selected content is provided into the template filing at step 320. At step 326, the server 108 may consult a knowledge base or any external service to analyze and infer more about the selected content received from user device 104. In one embodiment, the server 108 collects more information about the selected content from a database at the step 322. At step 328, the server 108 builds all the information related to the selected content into a class of "auxiliary data" and sends the auxiliary data (i.e. the auxiliary content) to the user device 104 at step 330. In an embodiment, the code is dumped for fetching the auxiliary content including relevant movie information, the recommendations, and the suggestions from the server 108.

```
public class EventDetailsTask extends AsyncTask<String, String, String>{
    StringBuilder builder1;
    String language, title, synopsis, genre, trailer;
    @Override
    protected String doInBackground(String... params)  {
        DefaultHttpClient httpClient = new DefaultHttpClient( );
        HttpGet httpGet = new HttpGet(params[0]);
        httpGet.addHeader("X-Kashape-Key", "hqHO2dU5awmshZPTWJvLuLbICwInp1DhzOsjsn4dsJGHpSZjY3");
        httpGet.addHeader("Accept", "application/json");
        try {
            HttpResponse httpResponse = httpClient.execute(httpGet);
            int statusCode = httpResponse.getStatusLine( ).getStatusCode( );
            if(statusCode != 200) {
                return null;
            }
            InputStream inputStream = httpResponse.getEntity( ).getContent( );
            BufferedReader reader = new BufferedReader (new InputStreamReader(inputStream));
            StringBuilder builder = new StringBuilder( );
            String line="";
            while((line = reader.readLine(l) != null){
                builder.append(line);
            }
            String date = builder.toString( );
```

Figure 4A:
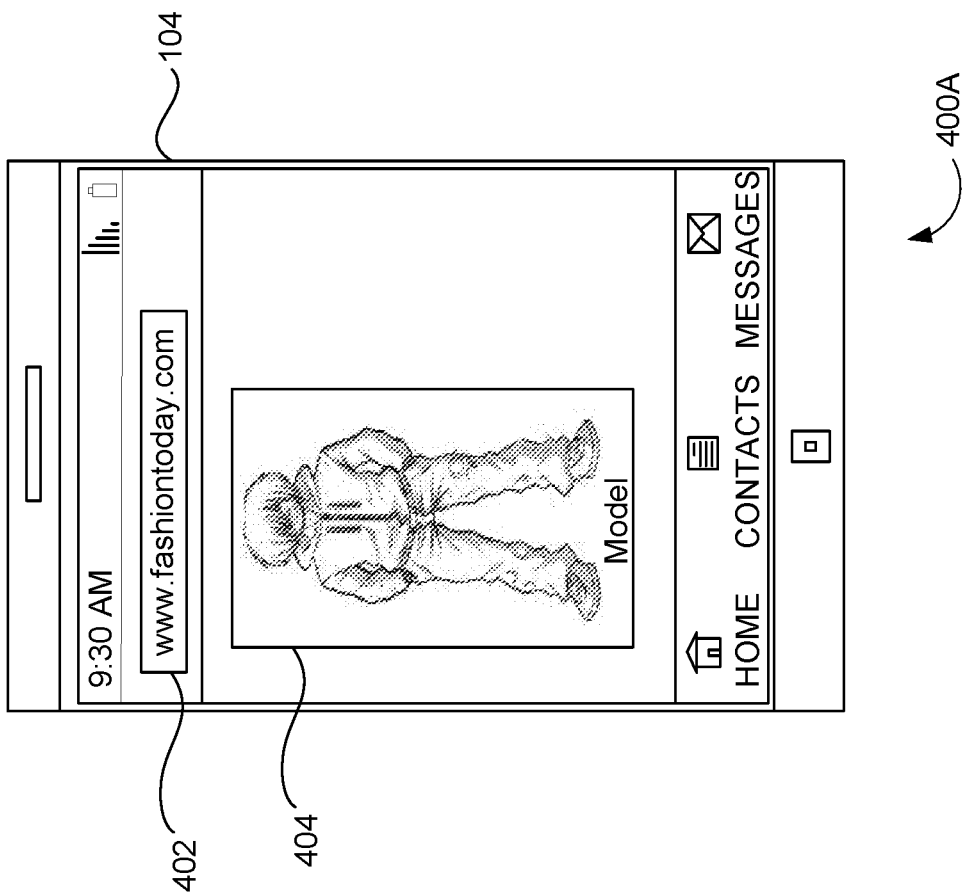
FIGS. 4A-4B are user interface views of the selected content in a website and the selected content being triggered to be replaced with the auxiliary content associated with the selected content of FIG. 1 according to an embodiment herein.
Figure 4B:
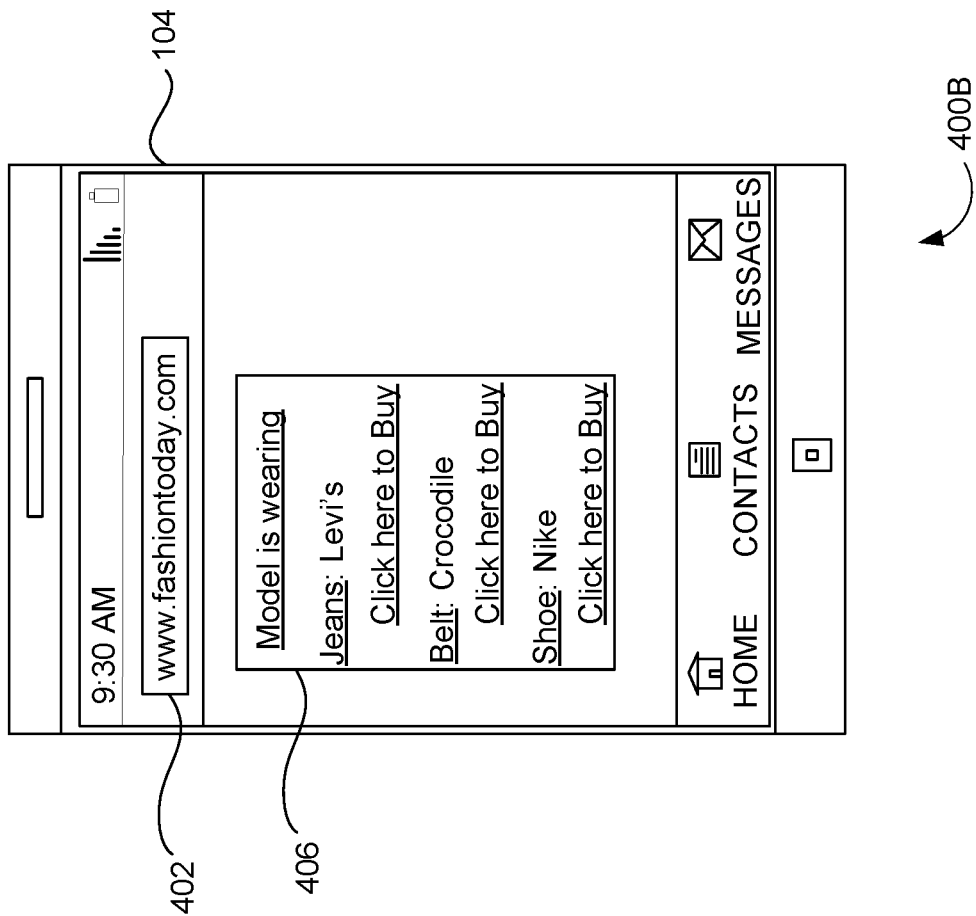

FIGS. 4A-4B are user interface views 400A-B of the selected content in a website and the selected content being triggered to be replaced with the auxiliary content associated with the selected content of FIG. 1 according to an embodiment herein. The user interface view 400A includes the user device 104, a website block 402 and a model 404 (i.e. the selected content). For example, when the user 102 inputs to select the model 404 and triggers the model 404 with the options of flipping and/or swiping the model 404, the model 404 (i.e. the selected content) is replaced with the auxiliary content 406 (i.e. the model 404 is wearing Levi's jeans, a Crocodile belt, and Nike shoes with option "Click here to buy") as shown in the user interface view 400 B of FIG. 4B.

Figure 4C:
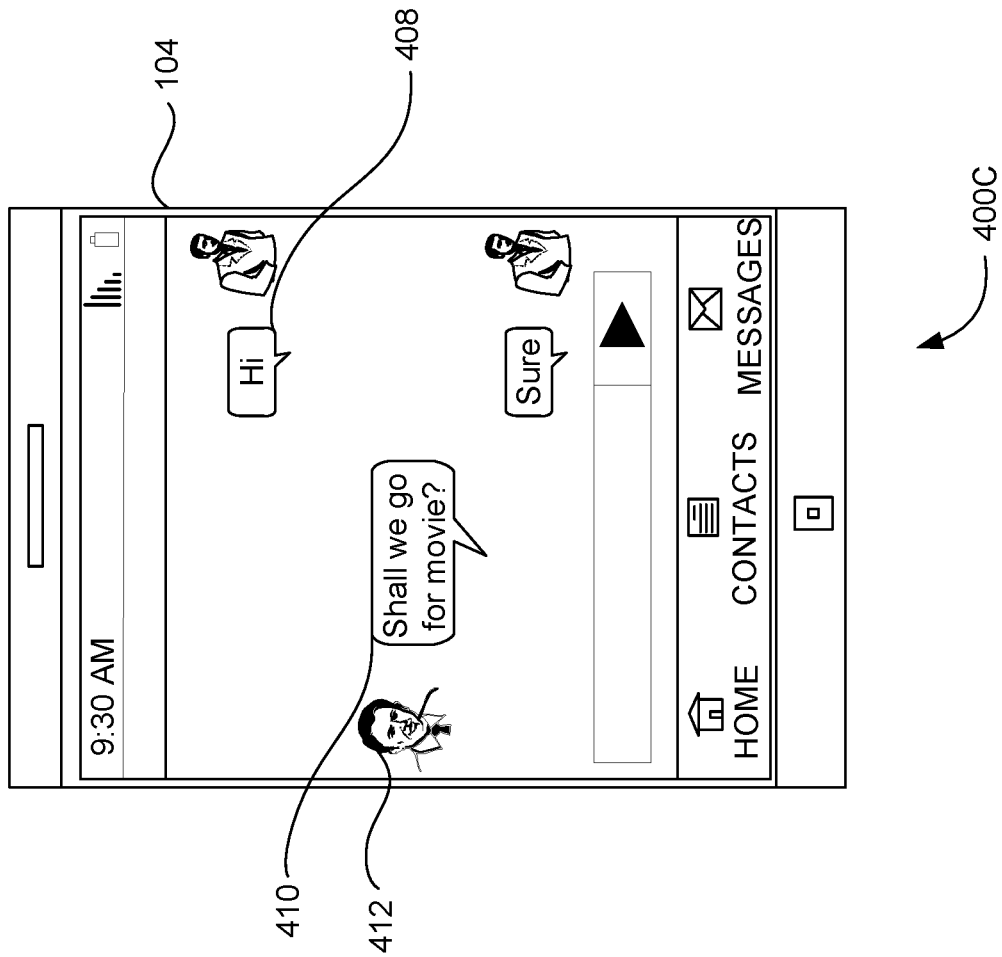
FIGS. 4C-4D are user interface views that illustrate selecting a chat bubble, and triggering the selected chat bubble to replace with the auxiliary content associated with the selected chat bubble of FIG. 1 according to an embodiment herein.
Figure 4D:
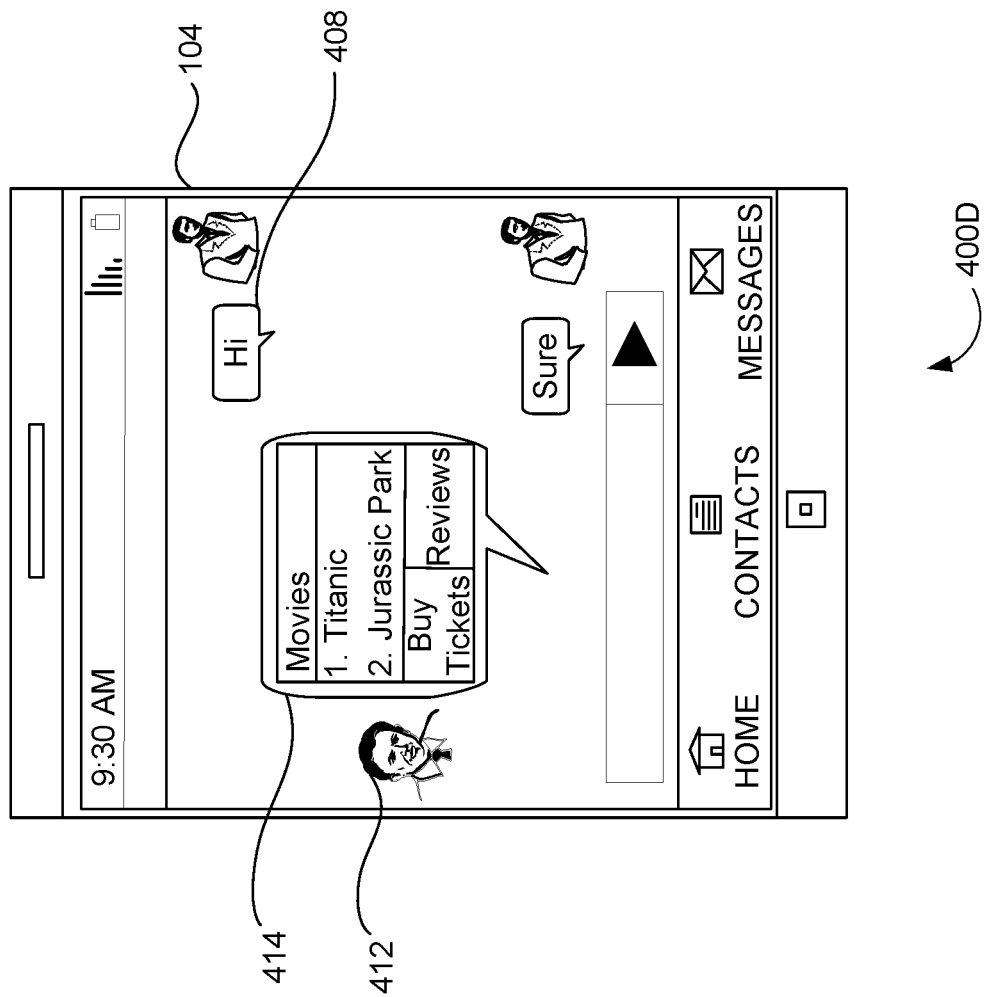

FIGS. 4C-4D are user interface views 400C-D that illustrate selecting chat bubbles, and triggering the selected chat bubble to replace with the auxiliary content associated with the selected chat bubble of FIG. 1 according to an embodiment herein. The auxiliary content may include the relevant information, the recommendations, and the suggestions associated with the selected chat bubble. The user interface view 400C includes the user device 104, a chat bubble 408 from the user 102 and a second chat bubble 410 from a second user 412. For example, when the user 102 is chatting with the second user 412, the user 102 inputs to select the chat bubble 410 of the second user 412 (i.e. the selected content as "shall we go for movie?"). When the user 102 triggers the chat bubble 410 by flipping and/or swiping, the chat bubble 410 (i.e. the selected content) is replaced with the auxiliary content 414 with the suggestions of the movies, the options with "Buy tickets" and "Reviews" of the movies, etc. as shown in the user interface view 400 D of FIG. 4D. The chat bubble (i.e. a speech bubble) is a graphic convention that is used commonly in chat applications in the user device 102. The coding with steps for fetching auxiliary information content from the server 108 are shown below.

Step 1: When the user 102 flips on the chat bubble 410.

Code snippet:
```
/* defining the TextView */
TextView textView = (TextView) findViewById(R.id.text);
/* flip event of text */
textView.setOnFlipListener(new View.OnClickListener( ) {
```

-continued

Code snippet:
```
@Override
public void onClick(View v) {
//the chat bubble will flip
}
});
```

Step 2: The chat bubble 410 rotates with the animation (i.e. flip animation)

Object Animator: a java class for flip animation.

Animator Set: The class plays a set of animations in the specified order

Code snippet:
```
/* create animation object to show the auxiliary content */
ObjectAnimator enter = ObjectAnimator.ofFloat(view, "rotationY", 180, 0);
/* create animation object to show main content */
ObjectAnimator exit = ObjectAnimator.ofFloat(view, "rotation", 0, -180);
AnimatorSet animator = new AnimatorSet( );
/* plays enter animation and then exit animation */
Animator.play(enter).after(exit);
Animator.start( );
```

Step 3: Initially the flipped side of the chat bubble 410 is blank. The auxiliary information content related to the message on the front side of the chat bubble 410 is fetched from the server 108 and displayed on the flipped side of the chat bubble 410.

```
/* The below code fetches the auxiliary data about movie from the
server */
        EventDetailsTask detailsTask = new EventDetailsTask( );
//execute( ).get( ) runs the AyncTask thread and the code for this thread
is in the next page.
        eventDetails = detailsTask.execute(urlMovie).get( );
/* The below code displays the auxiliary data about movie fetched from
the server */
        TextView txtFlip = (TextView) findViewById(R.id.textview);
        txtFlip.setText(Html.fromHtml(eventDetails));
```

Figure 5A:
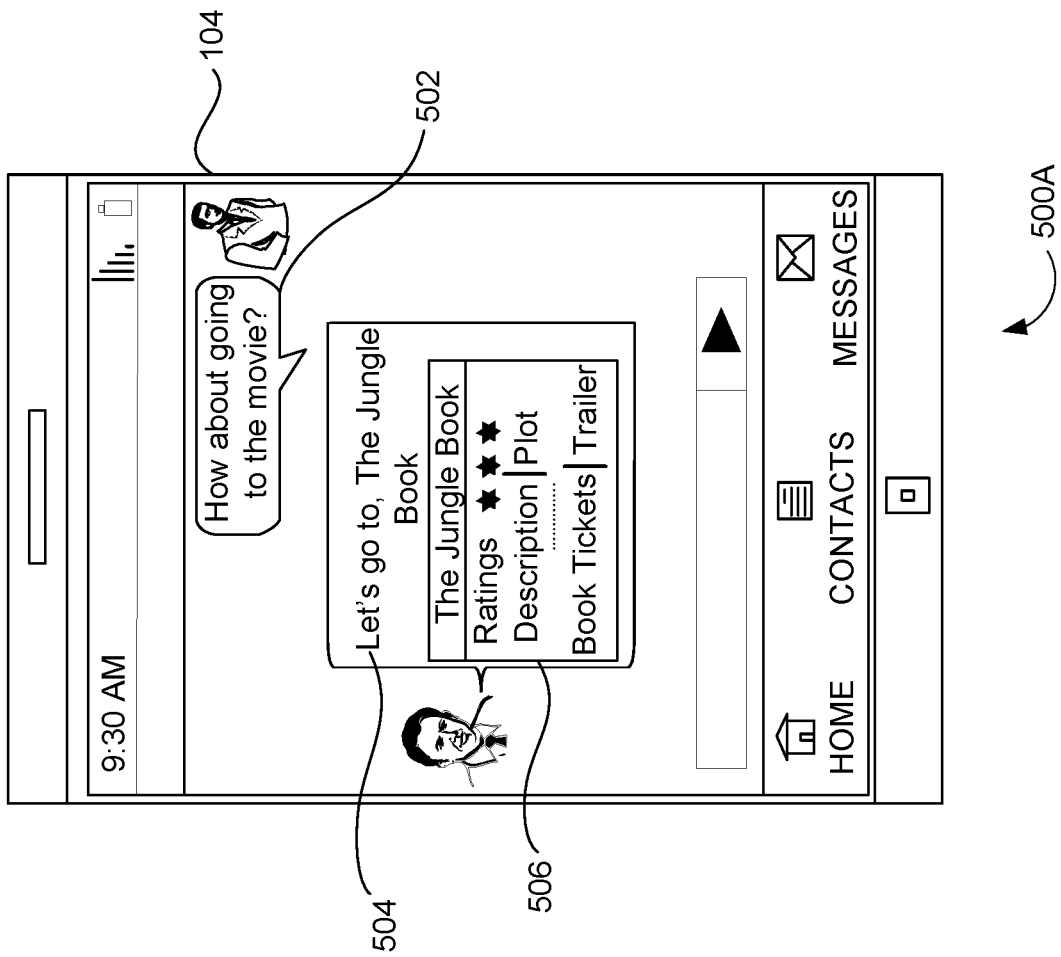
FIG. 5A is a user interface view that illustrates displaying the auxiliary content inline to the selected content of FIG. 1 according to an embodiment herein.

FIG. 5A is a user interface view 500A that illustrates displaying the auxiliary content inline to the selected content of FIG. 1 according to an embodiment herein. The user interface view 500A includes the user device 104, a third chat bubble 502 and a fourth chat bubble 504. For example, when the user 102 is chatting with another user, the user 102 inputs to select the fourth chat bubble 504 (i.e. the selected content as "Let's go to, The Jungle Book movie"). When the user 102 triggers the fourth chat bubble 504 by flipping and/or swiping, the auxiliary content 506 with (a) ratings of the movie, (b) description about the movie, (c) a "Book tickets" option or (d) a "trailer" option of the movie, etc are displayed along with the selected content (e.g. the auxiliary content is displayed inline to the selected content) as shown in the user interface view 500A of FIG. 5A.

Figure 5B:
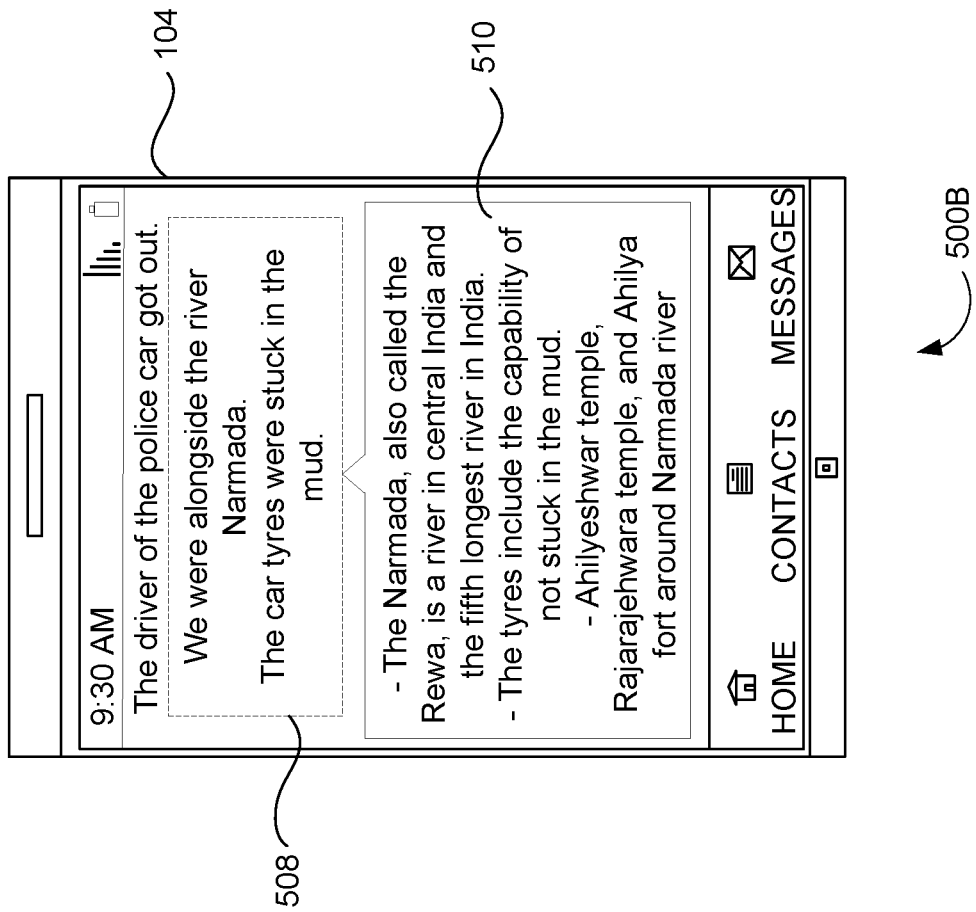
FIG. 5B is a user interface view that illustrates displaying of the auxiliary content using extension or plugin to an application which helps user to select the content of FIG. 1 according to an embodiment herein.

FIG. 5B is a user interface view 500B that illustrates displaying the auxiliary content using extension or plugin to an application which helps the user 102 to select the content of FIG. 1 according to an embodiment herein. The user interface view 500B includes a user device 104, a selected content 508 and an auxiliary content 510. For example, the content (e.g. "The driver of the police car got out, we were alongside the river Narmada. The car tyres were stuck in the mud") is displayed in the user device 104. The auxiliary content 510 with the information (e.g. "(a) The Narmada, also called the Rewa, is a river in central India and the fifth longest river in India, (b) The tyres include the capability of not stuck in the mud and (c) Ahilyeshwar temple, Rajarajahwara temple and Ahilya fort are available around the Narmada river") are displayed associated with the selected content 508 (e.g. "we were alongside the river Narmada. The car tyres were stuck in the mud" when the user 102 inputs to select the selected content 508. In an embodiment, the application displaying the content (e.g. word processing application, a PDF reader application, etc) on the user device 104 (e.g. a Smart phone, a computer, a PDA or a kindle etc.) may be provided with extensions or plugins to help the user 102 to select the content displayed in the screen space of the user device 104 and obtain the auxiliary content 510. In an embodiment, the website (e.g. the browser) may be extended to provide browser plugins or extensions that help the user 102 to select the content 508 (e.g. a text, an image, a portion of the image or a video) displayed in the browser and obtains the auxiliary content 510.

Figure 6A:
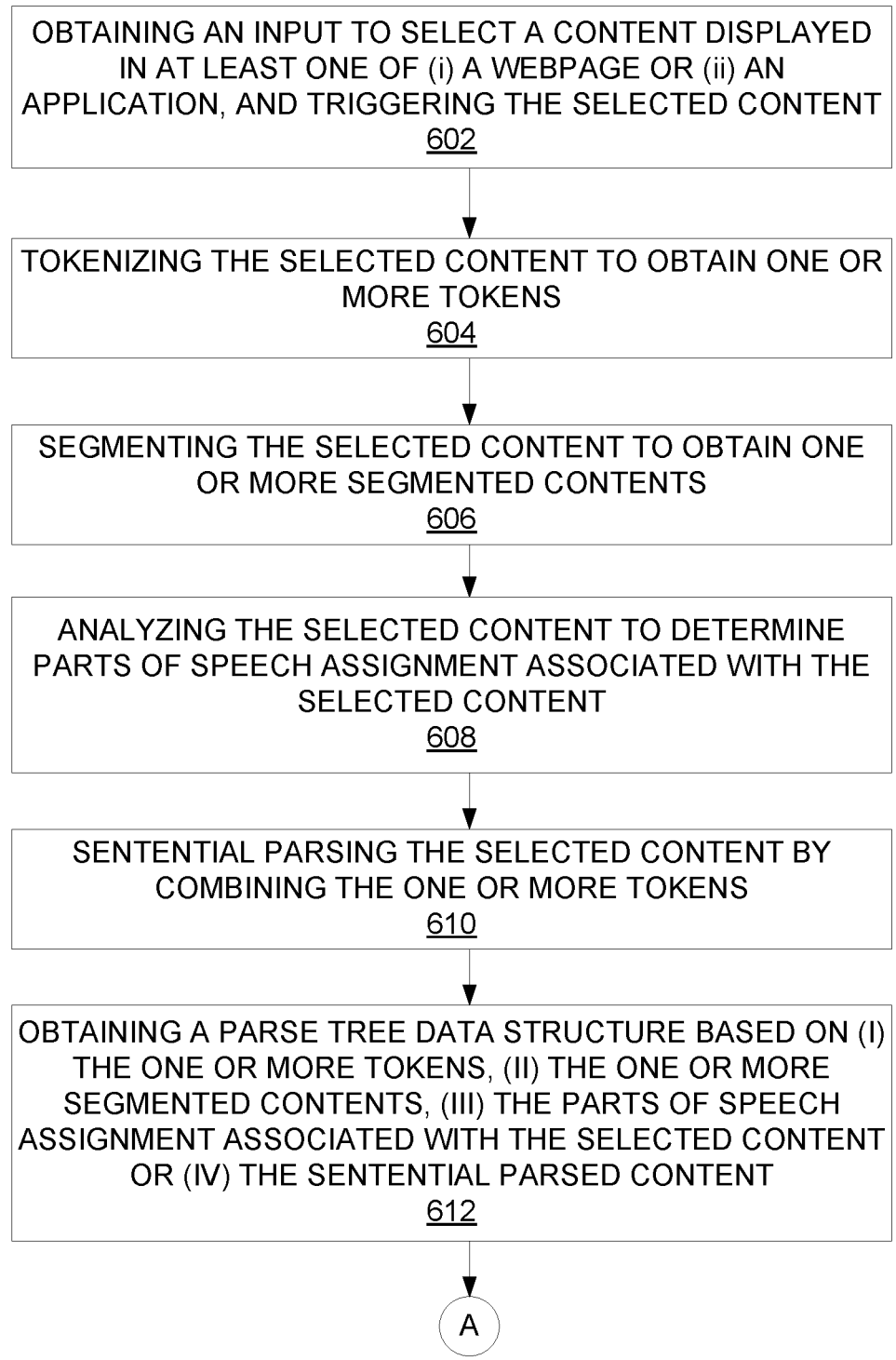
FIGS. 6A-6B are flow diagrams that illustrate a method of replacing a selected content with an auxiliary content associated with the selected content of FIG. 1 according to an embodiment herein.
Figure 6B:
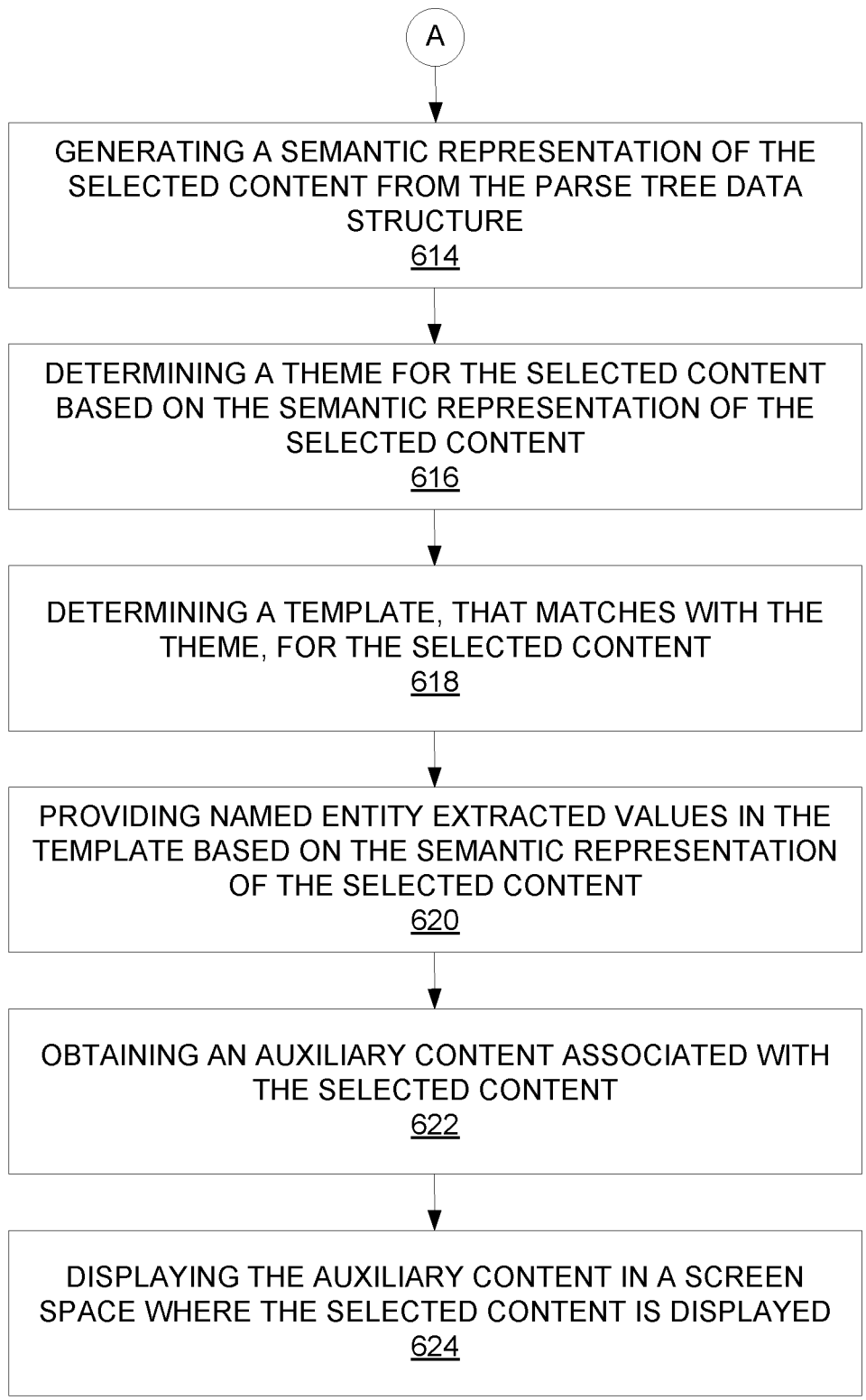

FIGS. 6A-6B are flow diagrams that illustrate a method of replacing a selected content with an auxiliary content associated with the selected content of FIG. 1 according to an embodiment herein. At step 602, an input is obtained to select a content displayed in at least one of (i) a webpage or (ii) an application, and the selected content is triggered. The selected content is triggered by at least one of (a) flipping the selected content, (b) swiping the selected content, (c) clicking to select a menu item in a context menu option associated with the selected content or (d) clicking to select an indicator button option after a selection of the selected content. At step 604, the selected content is tokenized to obtain one or more tokens. In an embodiment, the one or more tokens include at least one of words, phrases, symbols or other meaningful elements associated with the selected content. At step 606, the selected content is segmented to obtain one or more segmented contents. At step 608, the selected content is analyzed to determine parts of speech assignment associated with the selected content. At step 610, the selected content is sententially parsed by combining the one or more tokens. At step 612, a parse tree data structure is obtained based on (a) the one or more tokens, (b) the one or more segmented contents, (c) the parts of speech assignment associated with the selected content or (d) the sentential parsed content. At step 614, a semantic representation of the selected content is generated from the parse tree data structure. The semantic representation is a data structure representing a meaning associated with the selected content.

At step 616, a theme for the selected content is determined based on the semantic representation of the selected content. At step 618, a template that matches with the theme is determined for the selected content. At step 620, named entity extracted values are provided in the template based on the semantic representation of the selected content. At step 622, the auxiliary content associated with the selected content obtained from a server 108. The auxiliary content may include relevant information, recommendations or suggestions associated with the selected content. At step 624, the auxiliary content is displayed in a screen space where the selected content is displayed. In an embodiment, the auxiliary content is displayed by at least one of (a) replacing the selected content with the auxiliary content or (b) the auxiliary content along the selected content in line to the auxiliary content. In another embodiment, a whole content is displayed in a user device 104 is re-aligned and re-laid to provide the screen space for the auxiliary content. In an embodiment, a knowledge base or an external service is consulted to analyze and infer information associated with the selected content using the server 108. In another embodiment, the information associated with the selected content is grouped into a class of auxiliary data and the auxiliary data is communicated to the user device 104.

Figure 7:
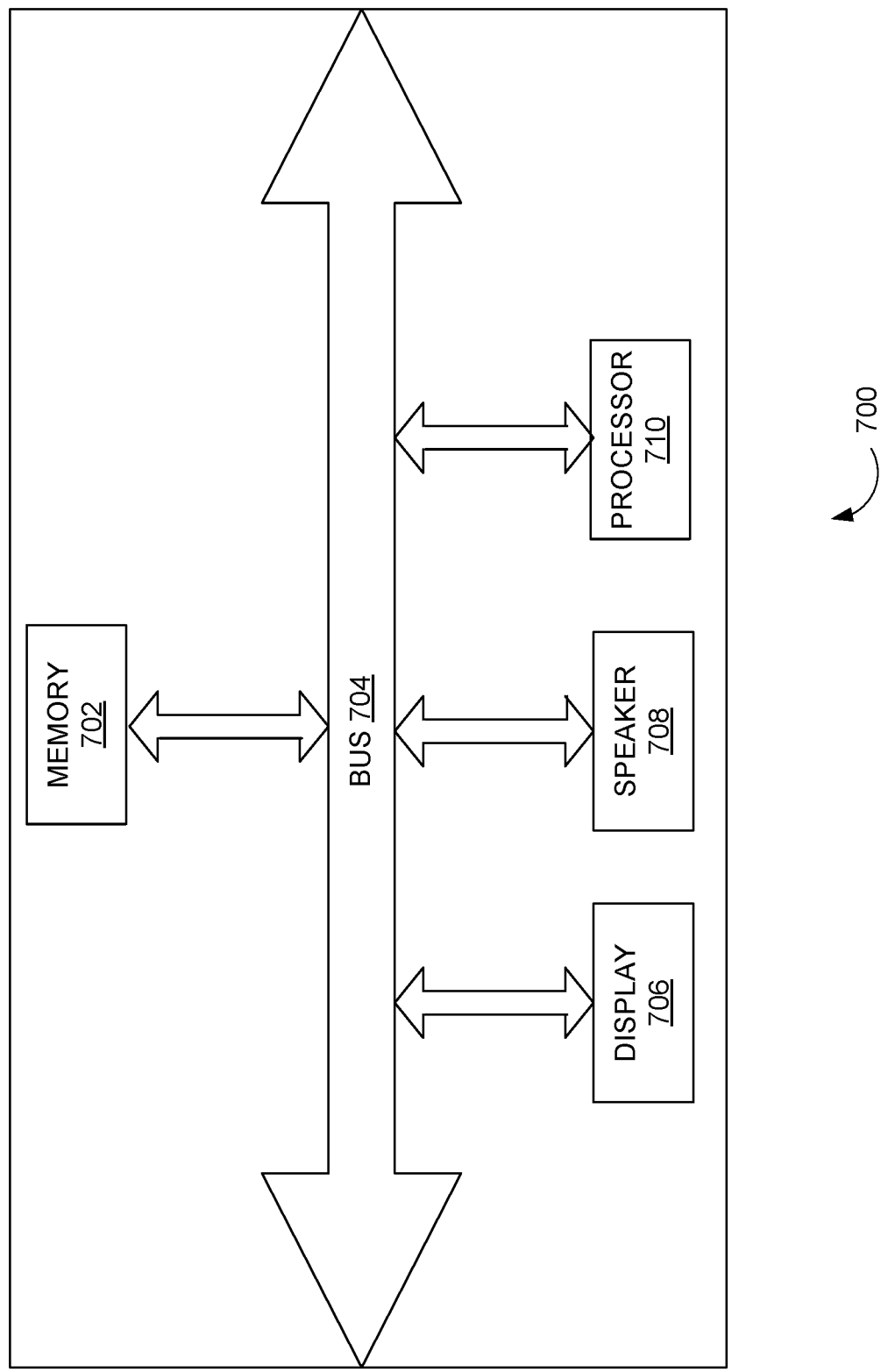
FIG. 7 illustrates an exploded view of a receiver of FIG. 1 according to an embodiment herein.

FIG. 7 illustrates an exploded view of a receiver 700 of FIG. 1 having a memory 702 having a set of instructions, a bus 704, a display 706, a speaker 708, and a processor 710 capable of processing the set of instructions to perform any one or more of the methodologies herein, according to an embodiment herein. The processor 710 may also enable digital content to be consumed in the form of video for output via one or more displays 706 or audio for output via speaker and/or earphones 708. The processor 710 may also carry out the methods described herein and in accordance with the embodiments herein.

Digital content may also be stored in the memory 702 for future processing or consumption. The memory 702 may also store program specific information and/or service information (PSI/SI), including information about digital content (e.g., the detected information bits) available in the future or stored from the past. A user of the receiver 700 may view this stored information on display 706 and select an item of for viewing, listening, or other uses via input, which may take the form of keypad, scroll, or other input device(s) or combinations thereof. When digital content is selected, the processor 710 may pass information. The content and PSI/SI may be passed among functions within the receiver 700 using the bus 704.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
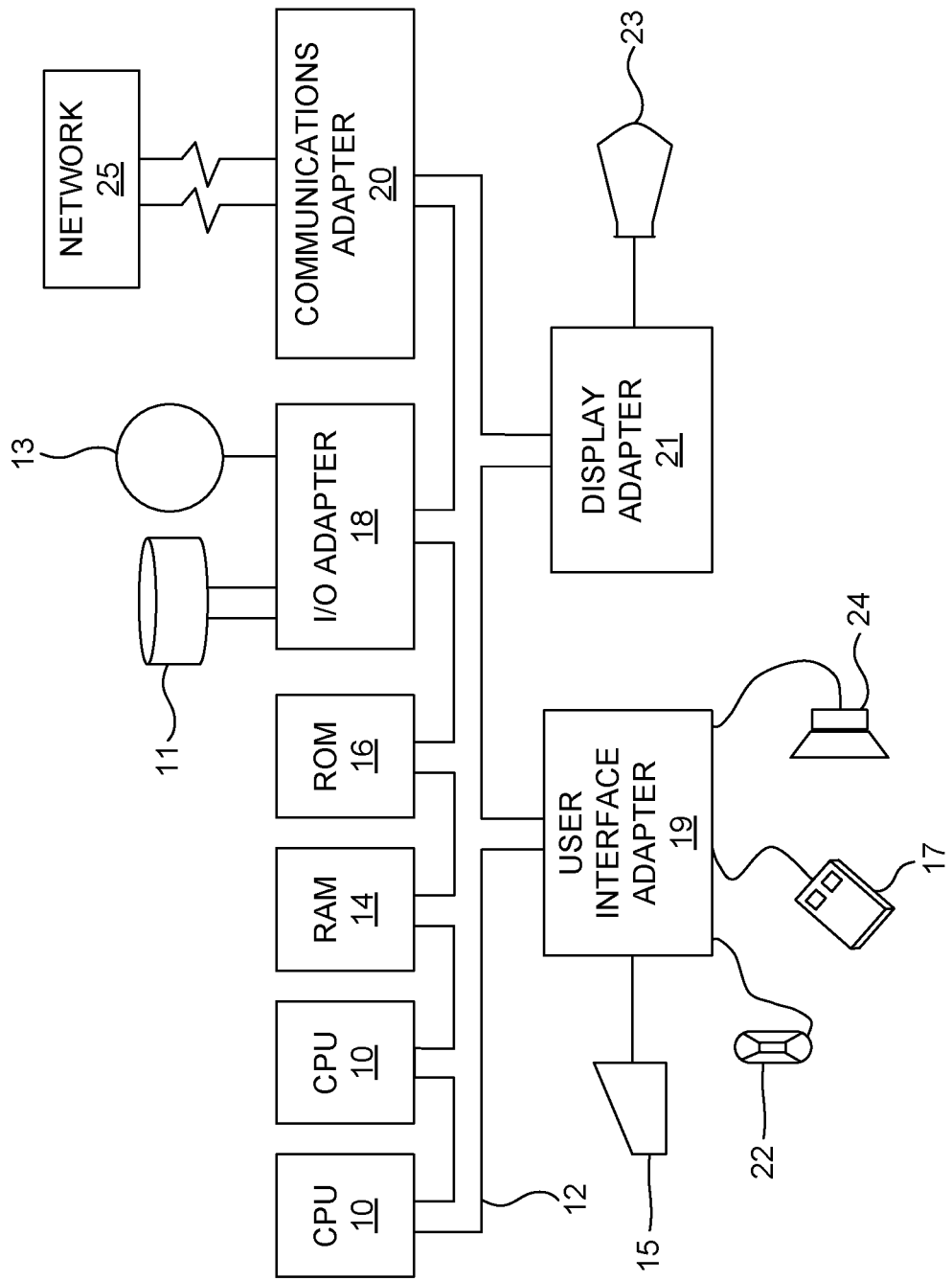
FIG. 8 illustrates a schematic diagram of computer architecture of a user device or a server, in accordance with the embodiments herein.

A representative hardware environment for practicing the embodiments herein is depicted in FIG. 8. This schematic drawing illustrates a hardware configuration of the user device 104 or the server 108 in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The recommendation and the suggestion system 106 is used to trigger the selected content to replace with the auxiliary content including the relevant information, the recommendations, the suggestions received from the server 108 associated with the selected content in the internet applications. The system 100 provides triggered recommendations and suggestions and other related information which are shown only when the user 102 wants (i.e. the user driven). The system 100 is used to minimize the screen space mainly in the hand held devices where screens are small in the user device 104. Because of the selected contents are replaced with the auxiliary content including relevant information, the recommendations, and the suggestions, the dedicated screen space may not be needed. The application including mobile applications that can be provided with software development kit (SDK) so that the application developers can use the software development kit to extend their application to provide a support of selecting the content and obtaining auxiliary content by interacting API (Application programming Interface) using the software development kit.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A computer implemented method for determining an auxiliary content based on a content selected by a first user and enabling said first user to perform one or more actions on said auxiliary content in a first user device, said method comprising:

obtaining an input to select a content displayed in at least one of (a) a webpage or (b) an application from said first user device, wherein said content that is provided in at least one of (a) said webpage or (b) said application of said first user device is obtained from a second user device, wherein said input comprises at least one of (a) flipping said selected content, (b) swiping said selected content, (c) clicking to select a menu item in a context menu option associated with said selected content or (d) clicking to select an indicator button option after a selection of said selected content, processing said selected content, wherein said processing comprises of implementing a linguistic process to determine a plurality of tokens by tokenizing said selected content, wherein said plurality of tokens comprise words, phrases, symbols and other meaningful elements associated with said selected content;

determine a plurality of segmented contents by segmenting said selected content;

determine parts of speech assignment associated with said selected content by analyzing said selected content using a knowledge base or an external service; and sentential parsing said selected content by combining said plurality of tokens;

generating a parse tree data structure by combining (a) said plurality of tokens, (b) said plurality of segmented contents, (c) said parts of speech assignment associated with said selected content and (d) said sentential parsed content;

generating a semantic representation of said selected content from said parse tree data structure, wherein said semantic representation is a data structure representing a meaning associated with said selected content;

determining a theme for said selected content based on said semantic representation of said selected content;

determining a preset format template, that matches with said theme, for said selected content;

mapping of fields of named entities and said named entity extracted values to fields and values of said template for populating named entity extracted values in said template based on said semantic representation of said selected content;

generating said auxiliary content with the information associated with said selected content in real time based on said populated template, wherein said auxiliary content comprises relevant information, recommendations or suggestions associated with said selected content;

replacing said selected content with said auxiliary content or displaying said auxiliary content along with said selected content inline to said auxiliary content, on said first user device in real time when said input is obtained from said first user device;

re-aligning and re-laiding a whole content that is displayed in at least one of (a) the webpage or (b) the application from said first user device to provide a screen space for said auxiliary content, wherein the (a) webpage or (b) application from said first user device are extended to provide browser plugins or extensions that enables user to select the auxiliary content; and enabling said first user to perform one or more actions by processing the set of instructions on said auxiliary content associated with said selected content.

2. The computer implemented method of claim 1, further comprising grouping information associated with said selected content into a class of auxiliary data and communicating said auxiliary data to said first user device.

3. A non-transitory program storage device readable by a computer, and comprising a program of instructions executable by said computer to perform a method for determining an auxiliary content based on a content selected by a first user and enabling said first user to perform one or more actions on said auxiliary content in a first user device, said method comprising:

obtaining an input to select a content displayed in at least one of (a) a webpage or (b) an application from said first user device, wherein said content that is provided in at least one of (a) said webpage or (b) said application of said first user device is obtained from a second user device, wherein said input comprises at least one of (a) flipping said selected content, (b) swiping said selected content, (c) clicking to select a menu item in a context menu option associated with said selected content or (d) clicking to select an indicator button option after a selection of said selected content;

processing said selected content, wherein said processing comprises of implementing a linguistic process to determine a plurality of tokens by tokenizing said selected content, wherein said plurality of tokens comprise words, phrases, symbols and other meaningful elements associated with said selected content;

determine a plurality of segmented contents by segmenting said selected content;

determine parts of speech assignment associated with said selected content by analyzing said selected content using a knowledge base or an external service; and sentential parsing said selected content by combining said plurality of tokens;

generating a parse tree data structure by combining (a) said plurality of tokens, (b) said plurality of segmented contents, (c) said parts of speech assignment associated with said selected content and (d) said sentential parsed content;

generating a semantic representation of said selected content from said parse tree data structure, wherein said semantic representation is a data structure representing a meaning associated with said selected content;

determining a theme for said selected content based on said semantic representation of said selected content;

determining a preset format template, that matches with said theme, for said selected content;

mapping of fields of named entities and said named entity extracted values to fields and values of said template for populating named entity extracted values in said template based on said semantic representation of said selected content;

generating said auxiliary content with the information associated with said selected content in real time based on said populated template, wherein said auxiliary content comprises relevant information, recommendations or suggestions associated with said selected content;

replacing said selected content with said auxiliary content or displaying said auxiliary content along with said selected content inline to said auxiliary content, on said first user device in real time when said input is obtained from said first user device;

re-aligning and re-laiding a whole content that is displayed in at least one of (a) the webpage or (b) the application from said first user device to provide a screen space for said auxiliary content, wherein the (a) webpage or (b) application from said first user device are extended to provide browser plugins or extensions that enables user to select the auxiliary content; and enabling said first user to perform one or more actions by processing the set of instructions on said auxiliary content associated with said selected content.

4. The non-transitory machine readable medium of claim 3, wherein said method further comprises grouping information associated with said selected content into a class of auxiliary data and communicating said auxiliary data to said first user device.

5. A server for determining auxiliary content based on a selected content by a first user and enabling said first user to perform one or more actions on said auxiliary content in a first user device, said server comprising:

a memory unit that stores a server database and a set of modules; and a processor that executes said set of modules, wherein said set of modules comprise:

a content obtaining module, implemented by said processor, that obtains an input to select a content displayed in at least one of (a) a webpage or (b) an application from said first user device, wherein said content that is provided in at least one of (a) said webpage or (b) said application of said first user device is obtained from a second user device, wherein said input comprises at least one of (a) flipping said selected content, (b) swiping said selected content, (c) clicking to select a menu item in a context menu option associated with said selected content or (d) clicking to select an indicator button option after a selection of said selected content;

a content processing module, implemented by said processor, that processes said selected content by implementing a linguistic process, wherein said content processing module comprises a content tokenizing module, implemented by said processor, that determines a plurality of tokens by tokenizing said selected content, wherein said plurality of tokens comprise words, phrases, symbols and other meaningful elements associated with said selected content;

a content segmenting module, implemented by said processor, that determines a plurality of segmented contents by segmenting said selected content;

a content analyzing module, implemented by said processor, that determines parts of speech assignment associated with said selected content by analysing said selected content using a knowledge base or an external service; and a content parsing module, implemented by said processor, that does sententially parses said selected content by combining said plurality of tokens;

a parse tree obtaining module, implemented by said processor, that generates a parse tree data structure by combining (a) said plurality of tokens, (b) said plurality of segmented contents, (c) said parts of speech assignment associated with said selected content and (d) said sentential parsed content;

a semantic representation generating module, implemented by said processor, that generates a semantic representation of said selected content from said parse tree data structure, wherein said semantic representation is a data structure representing a meaning associated with said selected content;

a theme determining module, implemented by said processor, that determines a theme for said selected content based on said semantic representation of said selected content;

a template determining module, implemented by said processor, that determines a preset format template that matches with said theme, for said selected content;

a value providing module, implemented by said processor, that maps fields of named entities and said named entity extracted values to fields and values of said template for populating named entity extracted values in said template based on said semantic representation of said selected content;

an auxiliary content obtaining module, implemented by said processor, that generates said auxiliary content with the information associated with said selected content in real time based on said populated template, wherein said auxiliary content comprises relevant information, recommendations or suggestions associated with said selected content, wherein said auxiliary content obtaining module replaces said selected content with said auxiliary content or display said auxiliary content along with said selected content in line to said auxiliary content on said first user device when said input is obtained from said first user device;

a screen space providing module, implemented by said processor, that re-aligns and re-laids a whole content that is displayed in at least one of (a) the webpage or (b) the application from said first user device to provide a screen space for said auxiliary content, wherein the (a) webpage or (b) application from said first user device are extended to provide browser plugins or extensions that enables user to select the auxiliary content; and a content displaying module, implemented by said processor, that enables said first user to perform one or more actions by processing the set of instructions on said auxiliary content associated with said selected content.

6. The server of claim 5, further comprising an information grouping module, implemented by said processor, that groups said information associated with said selected content into a class of auxiliary data and communicates said class of auxiliary data to said first user device.

7. The server of claim 5, wherein said selected content is a text, an image or a portion of said image, or a video.

8. The server of claim 5, wherein said auxiliary content allows interactions, wherein said interaction comprises at least one of (a) a text, (b) a voice, (c) an image, or (d) a video inputted by said user.

* * * * *